(12) United States Patent
Borde et al.

(10) Patent No.: US 7,631,249 B2
(45) Date of Patent: Dec. 8, 2009

(54) DYNAMICALLY DETERMINING A BUFFER-STACK OVERRUN

(75) Inventors: Shrikrishna V. Borde, Redmond, WA (US); Louis Lafreniere, Seattle, WA (US); Vance P. Morrison, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 648 days.

(21) Appl. No.: 11/250,347

(22) Filed: Oct. 14, 2005

(65) Prior Publication Data

US 2007/0089088 A1 Apr. 19, 2007

(51) Int. Cl.
*H03M 13/00* (2006.01)

(52) U.S. Cl. ............................ 714/799; 714/42; 714/54

(58) Field of Classification Search ................. 714/799, 714/818, 42, 54; 717/140
See application file for complete search history.

(56) References Cited

U.S. PATENT DOCUMENTS

| | | | | |
|---|---|---|---|---|
| 5,694,404 | A * | 12/1997 | Huang | 714/751 |
| 6,301,699 | B1 * | 10/2001 | Hollander et al. | 717/131 |
| 6,826,697 | B1 * | 11/2004 | Moran | 726/23 |
| 6,895,508 | B1 * | 5/2005 | Swanberg et al. | 726/16 |
| 6,996,677 | B2 * | 2/2006 | Lee et al. | 711/132 |
| 7,086,088 | B2 * | 8/2006 | Narayanan | 726/22 |
| 7,181,733 | B2 * | 2/2007 | Sarcar | 717/140 |
| 2002/0144141 | A1 * | 10/2002 | Edwards et al. | 713/200 |
| 2006/0225135 | A1 * | 10/2006 | Cheng et al. | 726/26 |

OTHER PUBLICATIONS

Robert Horvick, "*Stack Buffer Overrun Example*," Robert Horvick's Weblog, Jan. 16, 2004, available at http://blogs.msdn.com/roberthorvick/archive/2004/01/16/59460.aspx (copy of PDF enclosed entitled "Article 1." 4 pages).

"/GS (Buffer Security Check)," Microsoft Corporation, available at http://msdn2.microsoft.com/en-us/library/8dbf701c(vs.80).aspx (copy of PDF enclosed entitled "Article 2," 2 pages).

* cited by examiner

*Primary Examiner*—Esaw T Abraham
(74) *Attorney, Agent, or Firm*—Workman Nydegger

(57) ABSTRACT

Example embodiments provide for effectively executing a stack-walk and other operations by dynamically accessing information about the expected location of cookies on a stack. For example, a first function is executed that causes a stack-walk operation to occur. While performing the stack-walk operation, cookie location information for a cookie placed on the stack by a second function different from the first function is accessed. The cookie, if uncorrupted, includes a known value that is used to determine if the stack has been corrupted. Based on the cookie location information, corrupt data representative of the cookie is accessed. A global cookie, which also includes the known value, is also accessed. The known value of the global cookie is then compared with the corrupt data to determine that the stack is corrupted at least up to the location of the corrupt data representative of the cookie.

14 Claims, 7 Drawing Sheets

DYNAMICALLY DETERMINING A BUFFER-STACK OVERRUN

BACKGROUND

Computing technology has revolutionized the way people work and play and has contributed enormously to the advancement of humankind. Computers now aid in enumerable applications such as word processing, computer simulations, advanced gaming, voice recognition, and much more. Computing systems now come in a wide-variety of forms including, for example, desktop computers, laptop computers, Personal Digital Assistants (PDAs), and even mobile telephones and devices.

The various computing systems process or execute computer applications in many ways using a wide variety of processing tools and components. For example, computing systems commonly use a function or call stack as a data area tool, which provide applications with the ability for storing requests, functions, intermediate results, or other data awaiting processing. They are considered a stack because when one function calls another, rather than simply jumping to another part of the program, the current or return address in the call function is pushed onto the stack. Its value is then used when the callee function terminates by jumping the program counter back to the value that was stored there.

Computing systems allocate the data size of buffers on the stack to some finite amount of data. Due to the limited data size of these stack buffers, an anomalous condition can occur where a program somehow writes data beyond the allocated end of a stack buffer (commonly referred to as a stack buffer overrun or overflow). As a result, the extra information—which has to go somewhere—can overflow into adjacent data storage, corrupting or overwriting the valid data held therein. Although it may occur accidentally through programming error, buffer overflow is an increasingly common type of security attack on data integrity. In buffer overflow attacks, an overflow can corrupt protected data (return addresses, security objects, exception handling objects, other code addresses or data values) in a way designed to trigger specific actions, in effect causing new instructions to be executed on the attacked computer that could, e.g., damage the user's files, change data, and/or disclose confidential information.

Because such attacks (and buffer overruns in general) have the potential to cause serious problems to a computing system, different mechanisms for detecting and preventing buffer overrun attacks have been developed. For example, one common stack protection places a security cookie (or canary) on the stack in front of the saved protected data when calling a function. Such processes take advantage of the fact that functions must write data on the stack data in a predefined order (e.g., bottom to top, left to right, etc.). Accordingly, when an overflow to a local buffer occurs, the cookie is overwritten on the way to overwriting the saved protected data. Before the function returns, the cookie is checked against an authoritative version of the cookie (often referred to as a "global cookie" value, which may be randomly generated during routine startup) typically stored in a more secure section of the module where the function resides. If the cookies do not match then it is assumed that the buffer has been overflowed and the process may be aborted and/or other appropriate action taken.

Although the above described buffer protection mechanisms work well in many situations, they do not protect against all forms of attacks. For example, because the cookie value is checked only upon return to the operation that called the function, there is a possibility that the stack corruption may be exploited before the function returns. For instance, when a problem occurs such as a memory access violation or other error, an exception handler can be called to deal with such situations and allow the process to recover and continue execution as normal. In such instance, a scan of the stack is performed (referred to herein as a stack "walk" or "crawling" or stack unwind) to find the appropriate the exception handler. If, however, an attacker has overwritten this portion of the stack, the attacker can control the stack walk, and control the return address of the exception handling function, which may point to a block of code or an instruction that will redirect the flow of execution to some unexpected location (e.g., back to the overwritten buffer) allowing the attacker to gain control of the process. In addition, because the exception handler does not have information about where cookie(s) may be located on the stack (since typically it's only the callee function that has this information), the cookies cannot be checked during the stack-walk.

There are also other scenarios where a stack-walk is invoked and uses data on the stack which if corrupted can lead to an exploit before the stack cookie is checked when a function returns. For example, automatic memory management routines, such as garbage collecting (also known as GC), crawl the stack in an attempt to find the objects being used by the program, and to reclaim the memory used by objects that will never be accessed again by the application. In addition, there may be security functions that inquire about other functions that have called a particular routine in order to determine the rights of all corresponding functions. As before, the initiation of the before the return function is called; and thus before the cookie is checked.

Another problem with current buffer overrun detection systems is that even when the cookie is determined valid, a race condition may exists between the time the cookie is determined valid and when the protected stack data is used. For example, a lot of applications today are "multithreaded", which means that they can execute more than one thread or task at a time. Accordingly, problems may occur when two threads are reading and/or modifying the same stack at the same time. For instance, imagine two threads, A and B, who are operating on the same portion of the stack at virtually the same time. For example, thread A might want to discover all the functions being executed by thread B. Assuming thread A is a callee function that discovers a return value, it loads the appropriate cookie value from memory for validation. While thread A authenticates the cookie, however, thread B steps in and overwrites the protected data the cookie was protecting. After validation of the cookie, thread A now comes back and uses the overwritten data, allowing thread B to gain control of the process. Note that since thread B needs to get the sequence of events in just the right order, race conditions are very rare. Nevertheless, intruders are willing to continually attempt this technique in order to hack into computing systems.

BRIEF SUMMARY

The above-identified deficiencies and drawbacks of current overrun detection systems are overcome through example embodiments of the present invention. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for effectively executing a stack-walk operation by dynamically accessing information about the expected location of cookies on a stack. In this embodiment, a first function is called that executes a stack-walk operation to occur for identifying protected data on the stack. While performing the stack-walk operation, cookie location information for a cookie placed on the stack by a second function different from the first function is accessed. The cookie, if uncorrupted, includes a known value that is used to determine that the stack is uncorrupted after the determined location of the cookie. Based on the cookie location information, a corrupt data representative of the cookie is accessed. Further, a global cookie, which also includes the known value, is accessed. The known value of the global cookie is then compared with the corrupt data to determine that the stack is corrupted at least up to the location of the corrupt data representative of the cookie.

Another example embodiment provides for ensuring that memory on a stack owned by a second thread is not corrupted by the second thread operating on the stack while a first thread is accessing the stack. For example, a command by a first thread to begin a stack access of a stack of the second thread is received. Based on receipt of the command, a cookie and protected data are copied to a memory location separate from the stack of the second thread. Note that the copied cookie includes a known value that is used in determining that the stack is uncorrupted after the location of the copied cookie. In addition to the copied cookie, a global cookie is accessed, which includes the known value. Next, the known value of the copied cookie and the global cookie are compared to determine that the copied portion of the stack after the location of the cookie has not been corrupted. Accordingly, the copied protected data is used to ensure that the second thread that may be operating on the stack does not overwrite the cookie and protected data during the comparison of the cookie value to the global cookie value.

A further embodiment provides for reducing the likelihood that memory on a stack has been corrupted by a second thread when accessing a portion of the stack from the first thread. For example, a command by a first thread to begin a stack access of a stack of the second thread is received Based on the command, a cookie from the stack of the second thread at a boundary between data controllable by an application executing the thread and non-application controllable data is accessed by the first thread. Note that the cookie at the boundary includes a known value that is used in determining that the stack is uncorrupted after the boundary. In addition, a global cookie which includes the known value is accessed. Next, the known value of the copied cookie and the global cookie are compared to reduce the likelihood that the stack of the second thread has been corrupted after the location of the cookie at the boundary.

Additional features and advantages will be set forth in the description that follows, and in part will be obvious from the description, or may be learned by the practice of the invention. The features and advantages may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the embodiments described herein, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
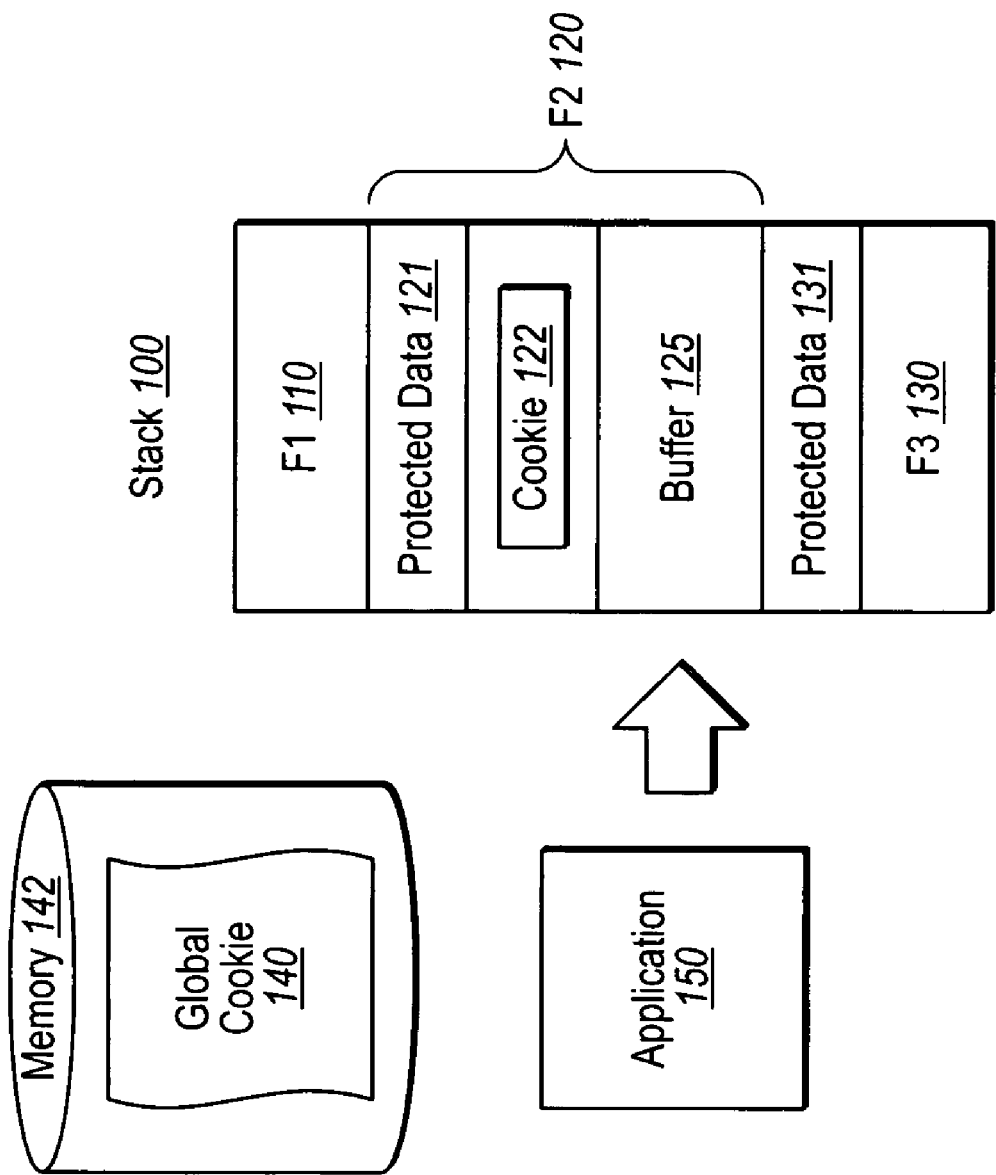
FIG. 1 schematically illustrates a computing system for detecting a buffer overrun using a cookie and global cookie.

The embodiments described herein extend to methods, systems, and computer program products for dynamically checking for stack-buffer overruns. The embodiments described herein may comprise a special purpose or general-purpose computer including various computer hardware or modules, as discussed in greater detail below.

Example embodiments provide for several mechanisms that are configured to overcome various deficiencies of current stack overrun detection systems. For example, one embodiment herein provides for a mechanism of dynamically maintaining and authenticating cookie information placed on a stack by various operations. Accordingly, when operations other than those that typically use the cookie information to validate protected data are called, the cookie location information is dynamically accessed and used to validate protected data before they are operated on. For example, when a stack-walk procedure is performed (e.g., when an exception, GC, security operation, or other stack-walk function is called), example embodiments allow for the function performing the stack-walk to access a dynamic list of cookie locations and use such information for determining if a buffer overrun has occurred. Note that list of cookie locations may be stored in a location separate from the stack, and/or the information may be dynamically maintained in various cookies' information on the stack itself. However, the start of the list will always be stored away from the stack to guarantee that it could not be corrupted.

Other embodiments also allow for ensuring (or at least a reduction in likelihood) that memory on a stack has not been corrupted by as second thread when reading a portion of the stack from the first thread. These embodiments take advantage of an ordering in which writes occur on the stack. For example, in one embodiment, when the first thread is required to read information from the stack of the second thread, the entire stack memory (or a select portion thereof) of the second thread can be copied to a location separate from the buffer-stack. The cookie in the copied location is then compared prior to executing the protected data. Once the cookie is validated, the copied data can be safely used by the first thread. Note that if a second thread is overwriting valid data on the stack, the cookie must first be overwritten before the other data can be. Accordingly, in this embodiment, even if a second thread overwrites the data on the stack while the cookie is authenticated, the overwritten data will not be used, since the first thread will read the uncorrupted data that it copied to another location in memory.

Note that the above embodiment for coping portions of the stack when validating a cookie gives a significantly high probability that the protected data has not been simultaneously overwritten. Nevertheless, such feature may consume high volumes of valuable processing and memory resources, since the entire stack needs to be continually copied to different portions of memory. Accordingly, other embodiments provide for a less statistically safe mechanism for ensuring that a race condition does not exist, but one that is not as processing and memory resource intensive. In this embodiment, a cookie value at a first location (e.g., at a boundary between managed and unmanaged code) below the memory on the stack of interest is first check. Immediately thereafter, if the first cookie is valid, a second cookie near the location on the stack of interest is validated (e.g., a cookie right before the protected data of interest). Because memory writes take longer to perform than the validation of a cookie, there is a high probability that if the second cookie is also authenticated another thread will not be able to overwrite the memory between the locations of the first and second cookies.

Although more specific reference to advantageous features are described in greater detail below with regards to the FIGS., embodiments within the scope of the present invention also include computer-readable media for carrying or having computer-executable instructions or data structures stored thereon. Such computer-readable media can be any available media that can be accessed by a general purpose or special purpose computer. Computer-readable media can comprise computer storage media or communication media. Computer storage media comprises RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a communication medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may also be described in terms of methods comprising functional steps and/or non-functional acts. Some of the following sections provide descriptions of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts is the recitation of the claims-and in the following description of the flow diagram (s) for FIGS. 3, 5, and 7—is used to indicate the desired specific use of such terms.

FIG. 1 illustrates a memory stack 100 that may be used by an application for performing an operation. Note that, stack 100 is created by an application 150, which pushes a function or subroutine 110 (referred to as F1 in the figure) onto the stack 100 for use during an operation. The function 110 may then need to call a function or subroutine 120 (referred to as F2 in the figure) in order to continue the execution of the operation. Accordingly, function 120 may also be pushed onto the stack by application 150. As illustrated, function 120 includes protected data 121 that is pushed onto the stack with function 120. In this description, in the claims, and in the Figures, protected data may be return addresses, security objects, exception handling objects, other code addresses or data values, and any other data that are vulnerable to be overwritten by a buffer overrun. The function 120 will typically return control to the function that called it, which in this case is function 110; however, that need not always be the case.

The above process for allocating memory may be recursively applied for any number of functions or subroutines. For example, function 120 may need to call a function or subroutine 130 (referred to as F3 in the figure) in order to continue the execution of the operation. Function 130 is pushed onto the stack by application 150, which also includes protected data 131 that is pushed onto the stack with function 130. Similar to protected data 121 for function F2, protected data 131 may be a return address that allows function 130 to know where to return control to when it has finished executing. Again, the function 130 will typically return control to the function that called it, which in this case is function 120. Assigning the return addresses when a function is pushed onto the stack helps ensure that when a function has completed its execution of the operation, it returns control to a valid memory location.

Note that function 120 (or F2) includes a buffer 125, which was allocated to the function based on the needs of that particular function. Because this data area was typically thought to be where overruns were likely to occur, cookies are typically placed between the buffer 125 and the next returning address 121. Accordingly, the function 120 before executing the protected data 121 will check the cookie value 122 against a global cookie 140 within memory 142 to ensure that a buffer overrun has not caused a corruption of the protected data 121.

As previously described, however, there may be instances where the protected data can be corrupted even with implementing the cookie authentication processes just described. For example, when a function invokes a stack-walk (e.g., when calling an exception, garbage collection, security check, etc.), an evaluation of the stack may be performed prior to reaching the protected data 121; and thus prior to checking the authentication of the cookie 122. In addition, there may be race conditions that can overwrite the protected data 121 during the validation of the cookie 122, thus allowing the function F2 (120) to both validate the cookie 122 and call corrupted protected data 121. Accordingly, embodiments herein describe various ways of eliminating or reducing some of these inherent problems of previous stack overrun detection systems.

Figure 2:
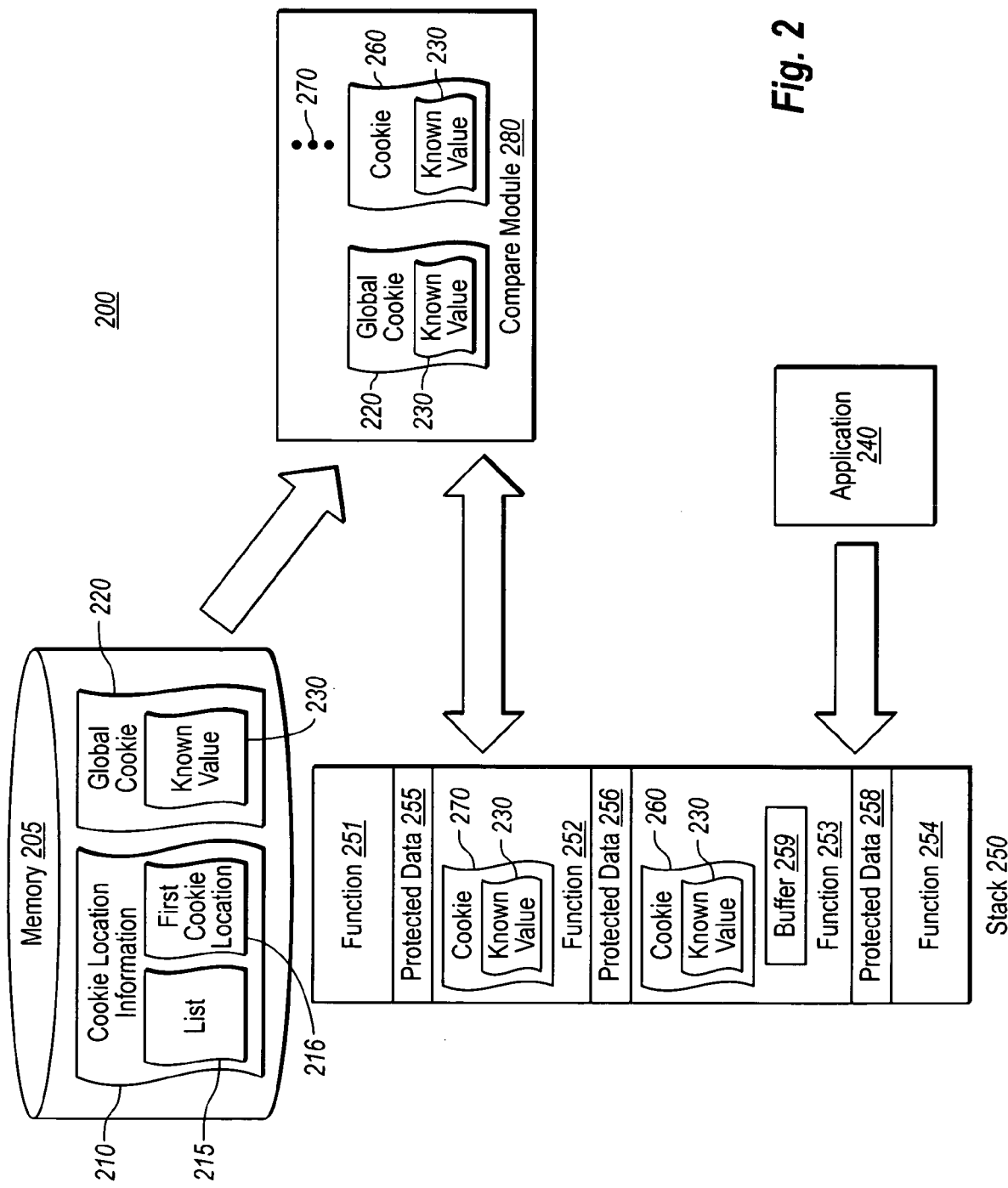
FIG. 2 schematically illustrates a computing system for determining if a portion of the stack has been corrupted in accordance with example embodiments.

FIG. 2 illustrates a computing system 200 for determining if a portion of a memory stack has been corrupted in accordance with one embodiment. Computing system 200 depicts various modules and components that can be used when implementing the embodiment. Note that computing system 200 is illustrated by way of example only and should not be used to limit the scope of the appended claims. It will be obvious to one of ordinary skill in the art after having read this description that there are numerous other computing systems that may be used to implement embodiments described herein.

Computing system 200 includes an application 240, which can be any computing applications known to one skilled in the art. Examples of well known applications include word processing, data storage, and the like. Application 240 may include a series of subroutines or functions that are utilized by application 240 to perform an operation.

In order to perform its operation, application 240 utilizes a memory stack 250, which is a data area used by application 240 for storing requests, functions, intermediate results, or other data awaiting processing. The stack 250 allows application 240 to efficiently allocate resources to multiple subroutines or functions that perform an operation of the application; and to manage the order in which the different subroutines or functions of the stack are executed during runtime of the application. Although the illustrated memory stack 250 includes four functions with various protected data, cookies, and/or buffers, it will be appreciated by one skilled in the art that this is for illustration only and should not be used to limit the scope of the appended claims as there are countless implementations of stack 250.

Note also that the following description(s) of FIGS. 1-7 describe various functions and memory allocations as being pushed and pulled from various stacks and returning to one or more functions. Although the following description may describe the placement of functions on the stack in a particular order, or may describe a particular return call for a particular function, embodiments herein are not necessarily restricted to the to a particular ordering of pushing and pulling functions from a stack, nor are embodiments considered with which particular protected data a function may point to. Accordingly, the any particular ordering to pushing or pulling functions on to and off of the stacks, and/or any reference to a particular return function call is used herein for illustrative purposes only and is not meant to limit or otherwise narrow the scope of embodiments herein described unless otherwise explicitly claimed.

In any event, application 240 may push a function or subroutine 251 onto the stack 250 for use during an operation. The function 251 may be any function or subroutine of application 240. In some embodiments, function 251 may need to call an additional function or subroutine in order to continue the execution of the operation. In such case, application 240 may also push application 252 onto the stack 250. Function 252 may also be any function or subroutine of application 240 (or possibly some other application). In order to allow function 252 to return control of the operation to function 251 (or any other function as the case may be) when function 252 has completed execution, protected data 255 is also pushed onto the stack by application 240.

Function 252 may also include a cookie 270, which is a piece of data, which as described above can be used in determining that the stack 250 has not been corrupted after the location of the cookie 270. More specifically, cookie 270 may include a known value 230 that can be randomly generated at the start of application 240 runtime. Advantageously, the random generation of known value 230 helps prevent programmers from knowing the value before the application runtime and using this knowledge for a malicious purpose.

Regardless of how the cookie 270 is generated, example embodiments provide that cookie 270 may be placed in a location on the stack 250 known by function 252. Note that the cookie 270 may be placed on the stack by the caller function (e.g., function 251), by the callee function (e.g., function 252), or any other function. Accordingly, embodiments described herein are not limited to any particular application that places the cookie 270 onto the stack 250. Nevertheless, as will become clear from reading this description, it is advantageous to place cookie 270 prior to protected data 255 as this will provide a way to verify that memory on stack 250 after the location of the cookie 270 has not been corrupted.

In some applications, function 252 will also need to call an additional function or subroutine in order to continue the execution of the application. As described previously, application 240 may push a function 253 onto the stack 250, which again may be any function or subroutine of application 240 (or other related application). As with function 252, application 240 can also push protected data 256 onto the stack 250, which can point to function, e.g., 252 and allows function 253 upon completion to return control of the operation to function 252.

Function 253 further may also include a buffer 259, which is memory allocated to function 253 when pushed onto the stack 250. Buffer 259 may be allocated to allow function 253 to execute its operation. The allocation of buffer 259, however, potentially subjects the function 253 to a buffer overrun or buffer overflow when data is written beyond the allocated end of the buffer. Note that as described herein, however, there are other ways of producing a buffer over run and data areas that are subject to attack. For example, as will be described in greater detail below, the boundary between managed and unmanaged code is another area that is subject to corruption due to buffer overflow. Accordingly, the use of the buffer 259 or any other data area in describing potential areas of where corruption may occur is for illustrative purposes only and is not meant to limit or otherwise narrow the scope of the embodiments herein.

In any event, suppose that application 240 is an electronic form that is filled out by a user. Further suppose that buffer 259 is used to store an entered name. Buffer 259 may be configured to be 100 bytes in size, which would normally be large enough to handle any name that would be entered. Nevertheless, if application 240 fails to ensure that an entered name does not exceed the allocated buffer length, then a buffer overrun may occur. For instance, if a 110 byte name were written to buffer 259, the extra 10 bytes could overwrite protected data 256 and change where the protected data pointed to. If the extra data were random, the protected data 256 may point to an area in memory which is not under the control of the currently executing application, causing a system fault when newly changed protected data 256 attempts to return control to the unintended memory location.

If, on the other hand, the extra data was not random, but was instead purposefully added by a malicious program, then control of application 240 could be shifted to an undesirable memory location. This potentially may cause application 240 to execute whatever code the malicious program has caused to be in that undesirable memory location with whatever privileges application 240 has. In many instances this can cause application 240 to do undesirable things such as, e.g., damage the user's files, change data, and/or disclose confidential information.

Similar to function 252, function 253 may also include a cookie 260, which includes information used in determining that data corruption has not occurred on the stack 250 after the location of the cookie 260. Cookie 260 also includes the known value 230, which is generated at the start of application 240 runtime. As will become apparent from reading this description, it may be advantageous to place cookie 260 before protected data 256 to help detect buffer overruns. Note, however, that in this embodiment the placement of cookie 260, 270 within the stack 250 may be anywhere. In fact, the cookie(s) 260, 270 may be randomly placed on the stack. Accordingly, for this embodiment, any positioning or location of a cookie 260, 270 on the stack is for illustrative purposes and is not meant to limit or otherwise narrow embodiments herein described unless otherwise explicitly claimed.

The above recursive calling of functions may continue to occur for any number of operations. For example, function 253 may need to call a function or subroutine 254 in order to continue the execution of the operation. Accordingly, the stack 250 may include any number of functions, with any number of return values, and any number of cookies associated therewith. Accordingly, the use of the four functions (251, 252, 253, 254), three of which have protected data (252, 253, 254), and the two cookie values (260, 270) are for illustrative purposes only and is not meant to limit or otherwise narrow embodiments described herein.

Regardless of the number of functions, protected data, or cookies on stack 250, computing system 200 also includes a memory 205 that is not part of the memory stack 250; and therefore not subject to any potential memory corruption caused by memory stack 250 buffer overrun. Memory 205 may be any type of volatile and non-volatile memory capable of storing data. Example embodiments allow memory 205, amongst other things, to store cookie location information 210, which includes data that specifies the location of the various cookies 260, 270 that are included in memory stack 250. Cookie location information 210 allows a function that did not place a cookie to access data about the location of the cookie when performing a stack-walk as will be further explained. Advantageously, this allows the stack-walking function to locate and use the cookie to determine if the stack 250 or portions of the stack have been corrupted by a stack overrun.

For example, when a function causes an exception to be thrown, or a GC routine is called, or any other function that causes a stack-walk is called, embodiments use the cookie location information 210 to allow the stack-walking function to authenticate cookies throughout the stack. As will be described in greater detail below, these cookies will advantageously be placed before protected data; however, this not need be the case. For example, the cookies may be randomly placed at various locations throughout the stack, and periodically checked as the stack-walk function executes. In any event, this information is dynamically maintained in order to allow a function that is performing a stack-walk (or any other function that did not necessarily place the cookie on the stack 250) to access the cookie information for authentication or validation that the stack 250 has not been corrupted at least beyond the location of the cookie.

In one embodiment, cookie information 210 consists of a dynamic list 215 that includes pointers to the individual cookie locations. This dynamic list is regularly updated every time a cookie is pushed onto stack 250 and every time a cookie is popped off of stack 250. For example, as previously mentioned when function 252 was pushed onto the stack 250, a cookie 270 was also placed therein. Accordingly, the caller function (e.g., function 251), callee function (e.g., function 252), or other function that placed or has knowledge about the cookie 270, may also write a pointer to the location of cookie 270 in the dynamic list 215. Later, the pointer to cookie 270 is removed from the dynamic list 215 when function 252, and therefore cookie 270, is popped off of stack 250. In a like manner, the location of cookie 260 and any other cookie on the stack are also dynamically added and removed as needed. As mentioned this allows a function or other application (with the appropriate rights), that did not necessarily add or have knowledge about the cookie on the stack 250, to ascertain the location of the cookie for authentication purposes.

Note that although the cookie location information 210 was a dynamic list 215, other embodiments provide that the location information may be distributed in other locations on the stack 250 itself. For example, the cookie location information 210 may include a first cookie location 216, which can point to a first cookie located on memory stack 250. Note that that the use of "first" to describe a cookie is not used to imply a location of any cookie on the stack 250, but is merely used to distinguish the cookie whose location information is contained in first cookie location 216. For instance, in this example, the first cookie location 216 can point to cookie 270. Cookie 270 then may include a pointer to the location of the next cookie on the stack, which in the illustrated example is cookie 260. Similarly, cookie 260 may then include a pointer to the location of an additional cookie that is not illustrated. Later, if function 253 and therefore cookie 260 are popped off the stack 250, cookie 270 may have a pointer to a different cookie written to it. In addition, if function 252 and therefore cookie 270 are popped off the stack 250, the location of the existing first cookie would be written to first cookie location 216. In this manner, the location of the first cookie may be maintained in cookie location information 210, while the location of the other cookies is maintained in the cookies themselves. As with the dynamic list 215, first cookie location 216 and the pointers in the cookies themselves allows a function to ascertain the location of the cookie of another function and then to access the cookie.

Regardless of whether the cookie location information 210 is in a dynamic list 215 or within the cookies themselves, the cookie location information 210 is used to access the known values 230 for validating that the stack has not been corrupted beyond the location of the cookie. For example, memory 205 may also store a global cookie 220, which contains global information about application 240. This information includes the known value 230 that is also included in cookies 260 and 270. As described, the known value 230 may be randomly generated at the start of application 240 runtime, which may be compared with the known values 230 of cookies 260, 270, and any other cookie on stack 250 to determine if stack memory corruption has occurred.

The values within the cookies 270 may then be compared to the known value 230 in the global cookie 220 for determining if a stack overflow has occurred. For example, system 200 may include a compare module 280, configured for comparing two or more values. It may be implemented in software, computer hardware, or any combination of the two. Compare module 280 or other component may be configured to access the cookie location information 210 in memory 205. Using this information, the compare module 280 (or other component) may then accesses the individual cookies found on stack 250 (e.g. cookies 260 and 270). In FIG. 2, compare module 280 is illustrated as accessing cookie 260 and potentially cookie 270 and other stack 250 cookies as represented by the ellipses 270.

Compare module 280 also is configured to access global cookie 220 in memory 205. The compare module 280 may then compare the known values 230 contained in the global cookie 220 and the cookies from the stack 250. If the known values 230 of an individual cookie, for example cookie 260, and the global cookie 220 match, then it is determined that the memory on the stack has not been corrupted at least past the location of the cookie. Since the cookies are typically placed in a location prior to protected data, the protected data may be executed with a high degree of confidence that the protected data has not been corrupted. Note that validation of the cookie only determines that the memory has not been corrupted beyond the point of the cookie, since corruption below the cookie may be occurring. Also note, as will be discussed in greater detail below, that a race condition may occur that does not guarantee that validation of the cookie means that the protected data is not corrupted.

In any event, if on the other hand, the known values 230 of the global cookie and the individual cookie do not match, then it may be determined that the memory stack 250 has become corrupt up to and to some point beyond the location of the cookie. An exception or other command can then be executed to terminate the operation to thereby prevent the possible return of control to an undesirable portion of memory. Note, however, that other functions are also available other than just aborting the operation. For example, a report may be generated and returned to a system admin, the system may attempt to recover from the error, or any other well known functions once a potential overrun has occurred are also available. Accordingly, aborting an operation once a stack overflow has been determined is used for illustrative purposes only and is not meant to limit or otherwise narrow the scope of embodiments herein described.

Figure 3:
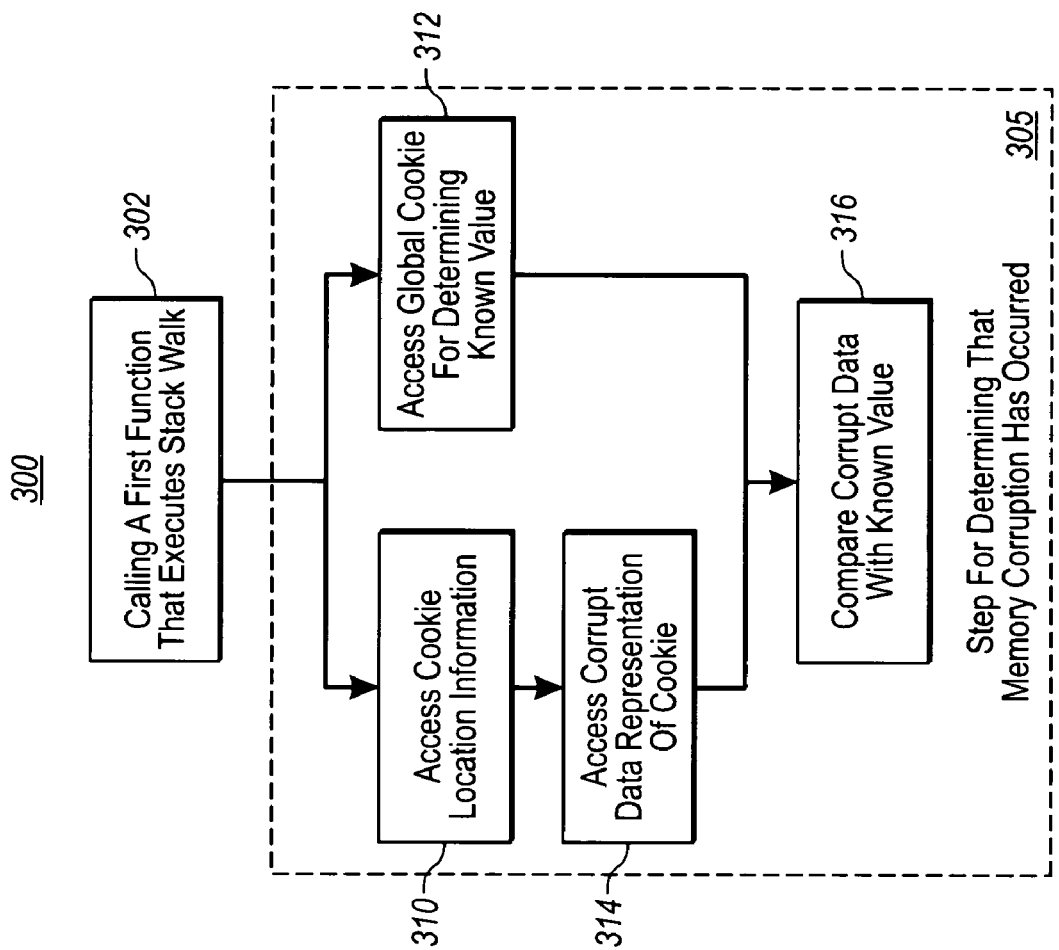
FIG. 3 illustrates a flowchart of a method for executing a stack-walk to determine if a portion of the stack has been corrupted in accordance with example embodiments.

Turning now to FIG. 3, a flowchart of a method 300 for effectively executing a stack-walk by dynamically accessing information about an expected location of a cookie placed on the stack by another operation and used in determining if a portion of the stack has been corrupted. Method 300 will be described with frequent reference to the computing system discussed in relation to FIG. 2. However, it should be noted that the computing system 200 is only one of numerous computing systems that can be configured to perform method 300 and should not be used to limit the scope of the appended claims.

Method 300 includes an act of calling 302 a first function that executes a stack-walk. For example, some function, e.g., 251, 252, 253, may call a first function that performs a stack-walk operation, e.g., an exception, garbage collection, security function, or other operation. Note that the stack-walk function is used in identifying protected data on a stack. Further, the first function may be part of stack 250, for instance function 254. The first function, however, may also be a function that is operating on a thread that is independent of stack 250.

The execution of the first function causes the first function to perform a stack-walk operation. More specifically, a stack-walk operation causes a function to walk a stack by scanning the stack for information such as a return address or other protected data. For example, function 254 could be an exception handling operation. Function 254 (or some other function) could throw an exception and would then perform a stack-walk by scanning the other functions on stack 250 looking for an exception handler return addresses. Alternatively, function 254 could perform a garbage collection operation whereby the function would scan the other functions for memory that was no longer needed for the function.

In addition, method 300 includes a step for determining that memory corruption of the stack has occurred. Although step 305 can comprise any number or order of corresponding acts for accomplishing the desired result, while performing the stack-walk step 305 comprises at least an act of accessing 310 cookie location information for a cookie that was placed on the stack by a function other than the function performing the stack-walk. For example, a function performing the stack-walk may access cookie location information 210 for determining where a second function different from the function performing the stack walk placed a cookie on the stack, wherein if uncorrupted the cookie includes a known value used in determining that a portion of the stack is uncorrupted after the determined location of the cookie.

Note that in this embodiment, the function performing the stack-walk may frequently inquire as to whether or not a particular function has a cookie associated with it. For example, as a function scans the stack 250, the function may continual access the cookie location information 210 and inquire as to whether or not a certain function has a cookie associated therewith. If so, the stack-walk function may get additional information as to the location of the cookie on the stack 250.

In another embodiment, the cookie location information 210 may be included in a memory 205 separate from the stack, or it may be located on the stack itself. For example, the cookie location information may be a dynamic list 215 of cookie location stored in memory 205, or the information may be pointer(s) within a cookie to location of other cookies on the stack. In this later embodiment, a fist cookie location 216 should typically be stored in a separate memory 205 location that identifies the location of a first cookie on the stack, which can then be used to determine other cookies on the stack. Note that as cookies are pushed to or pulled from the stack 250 that the dynamnic list 215, first cookie location 216, and/or location information within the cookies, may need to be updated.

Step 305 further includes an act of accessing 314 corrupt data on the stack representative of the cookie based on the cookie location information. For example, based on the cookie location information 210, the function performing the stack-walk (or some other function working on behalf thereof) may access a location on the stack where the cookie is supposed to reside. In this example, the cookie 270 is corrupt such that the data retrieved from the stack 250 is representative of the cookie, and not the actual cookie placed on the stack 250.

Step 305 also includes an act of accessing 312 a global cookie that is separate from the stack for determining a known value. For example, global cookie 220 in memory location 205 may be accessed, which includes known value 230 that will not be corrupt by any potential stack 250 memory corruptions. As is indicated in FIG. 3, the order that acts 310 and 312 occur are unimportant as the acts may occur simultaneously or one act may occur prior to the other act.

Step 305 further includes an act of comparing 316 the corrupt data representing the cookie with the known value for determine that memory corruption has occurred on the stack at least up to the location of the corrupt data representing the cookie. For example, compare module 280, whether a part of the stack-walk function or prompted by function some other function, may compare the corrupted data representing cookie 260 with global cookie 220. As mentioned, global cookie 220 includes an uncorrupted known value 230. Compare module 280 compares the known value 230 with information contained in cookie 260. If function 253 has not been corrupted, then cookie 260 will still include known value 230. If, as in this example, function 253 has been corrupted, then cookie 260 will not include known value 230 and it can be ascertained that stack 250 has been corrupted up to at least the location of cookie 260.

Upon discovering that the memory stack has been corrupted up to the location of cookie 260, an exception can be thrown that terminates the stack-walk. This prevents function 254 from executing the corrupted protected data 256. Those skilled in the art will appreciate that there are also countless other ways that computing system 200 can terminate the stack-walk or any other mitigating factors that may be performed. As will be appreciated, terminating or otherwise taking some mitigating action on the stack-walk operation upon determination of a corrupt cookie may prevent the potentially harmful consequences of a buffer overrun.

If the compare module 280 determines that the cookie 260 has not been corrupted, then stack-walk function is safe to execute the protected data in the stack after the cookie location. The stack-walk function may then repeat the above steps and acts as the stack is continues to be scanned. In fact, this process may be repeated as needed for all cookies located on stack 250.

Figure 4:
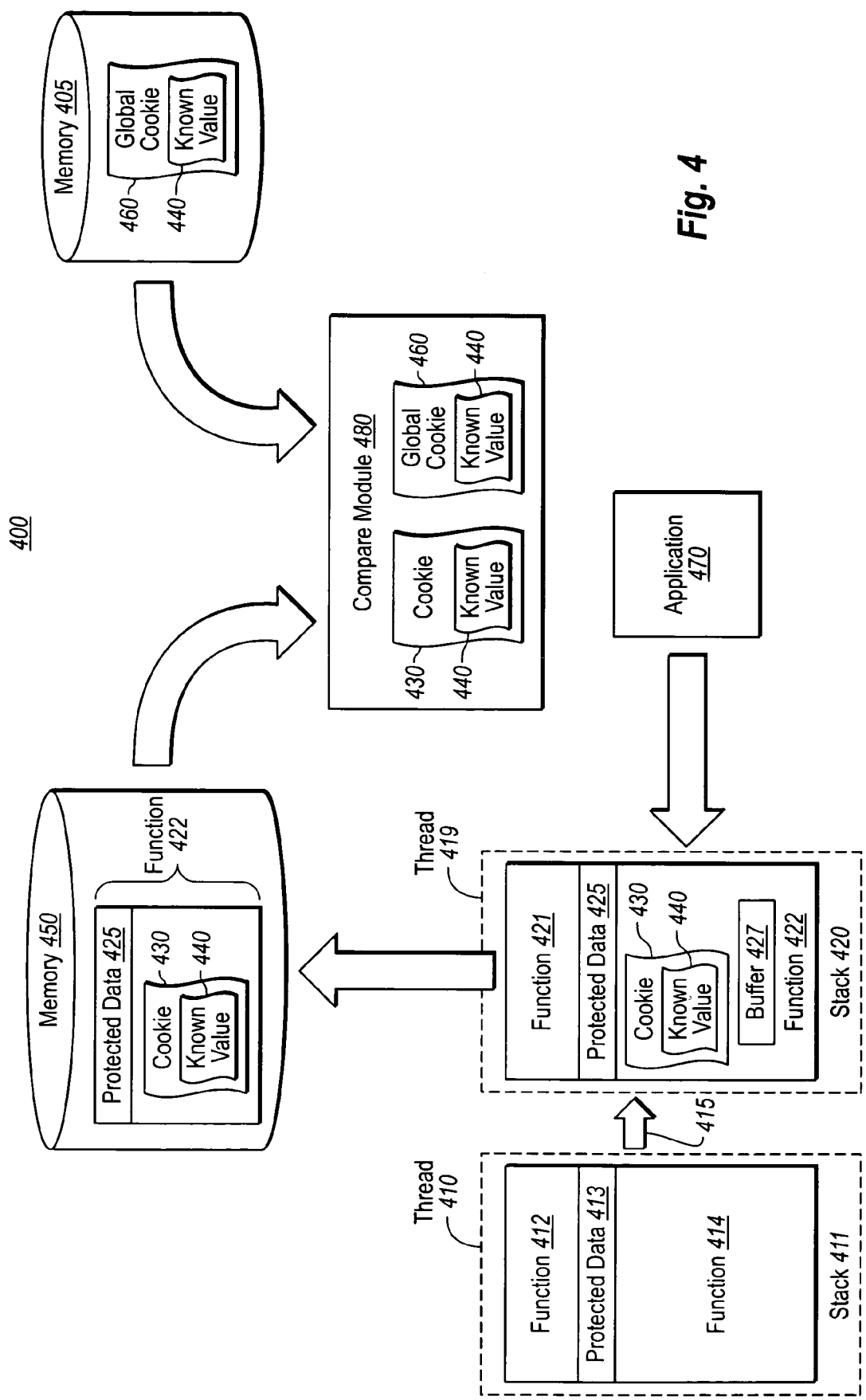
FIG. 4 schematically illustrates a computing system for ensuring that memory on a stack is not corrupted by a second thread while being accessed from a first thread in accordance with example embodiments.

Embodiments described herein are also configured to prevent or reduce the likelihood of the race condition previously described. Accordingly, FIG. 4 illustrates a computing system 400 for a first embodiment of ensuring that memory on a stack is not corrupted by a second thread when the stack is being accessed by a first thread. Similar to computing system 200, computing system 400 depicts various modules and components that can be used when implementing the embodiments described herein. Nevertheless, computing system 400 is illustrated by way of example only and should not be used to limit the scope of the appended claims. It will be obvious to one of ordinary skill in the art after having read this description that there are numerous other computing systems with any number of various modules or components that may be used to implement embodiments herein.

Computing system 400 includes an application 470, which again may be any computing application known to one skilled in the art. Application 470 utilizes a memory stack 411 of a first thread 410 and a memory stack 420 of a second thread 419 for storing requests, functions, intermediate results, or other data awaiting processing. Both stacks 411 and 420 otherwise operate as described previously for stack 250. For example, application 470 can push and pull various functions or subroutines onto and off of the stack 420 for use during an operation. The functions 421, 422 that reside on the stack 420 may be any function or subroutine of application 470. In some embodiments, function 421 may need to call an additional function or subroutine in order to continue the execution of the operation. In this example, application 470 may push application 422 onto the stack 420. Function 422 may also be any function or subroutine of application 470. In order to allow function 422 to return control of the operation to a function (e.g., 421) when function 422 has completed execution, protected data 425 is also pushed onto the stack. Protected data 425 may be a pointer that points to a return function (in this example function 421) for determining where function 422 will return control to when it has finished executing.

Function 422 may also include a cookie 430, which may be similar to the cookies discussed in relation to FIG. 2 that include a known value 440 that is randomly generated at the start of application 470 runtime to prevent prior knowledge of the known value. Cookie 430 is placed in a location of function 422 prior to protected data 425. Note, however, that the cookie may not be immediately adjacent to the location of the protected data 425. It is possible for there to be other vulnerable data between the cookie 430 and the protected data 425. Accordingly, the precise location of the cookie as described herein is for illustrative purposes only and is not meant to limit or otherwise narrow the scope of embodiments herein.

Function 422 further includes a buffer 427, which is memory that is allocated to function 422 when the function is pushed onto the stack 420. Buffer 427 is allocated to allow function 422 to execute its operation, yet potentially subjects function 422 to a buffer overrun as previously discussed in relation to FIG. 2. Note, however, that for embodiments described herein, the function 422 whose protected data is being protected by this example embodiment need not include buffer 427, and the overrun may start or occur at some other location with stack 420.

In like manner, application 470 can push and pull various functions or subroutines onto and off of the stack 411 for use during an operation. The functions 412, 414 that reside on the stack 411 may be any function or subroutine of application 470. In some embodiments, function 412 may need to call an additional function or subroutine in order to continue the execution of the operation. In this example, application 470 may push application 414 onto the stack 411. Function 414 may also be any function or subroutine of application 470. In order to allow function 414 to return control of the operation to a function (e.g., 412) when function 414 has completed execution, protected data 413 is also pushed onto the stack. Protected data 413 may be a pointer that points to a return function (in this example function 412) for determining where function 414 will return control to when it has finished executing.

In this embodiment, thread 419 executes using stack 420. Thread 419 might call function 421 to perform some work, which might call function 422 as previously described. Another thread 410, which executes using stack 411, may wish to inspect stack 420, which belongs to thread 419, as illustrated by arrow 415. Thread 410 may be required to inspect the stack 420 for purposes of doing a garbage collection operation that cause a stack-walk to occur. In alternative embodiments, thread 410 does not need to be a function that performs a stack-walk, but rather one that reads and/or writes data on the stack 420. In fact, thread 410 may include any function or operation on or off of the stack 420.

In some circumstances, while thread 410 inspects stack 420, thread 419 might continue to perform operations which causes a corruption of stack 420. This may lead to a race situation where a buffer overrun corrupts the stack 420 without the thread 410 knowing that stack corruption has occurred. For example, thread 410 may be inspecting protected data 425 as part of the stack walk, and begin comparing the cookie 430 with a global cookie 430 in order to determine if a buffer overrun has occurred. Because thread 419 is actively executing its operation on stack 420, it is possible that while thread 410 verifies that cookie 430 as valid known value 440, thread 419 causes a buffer 427 overrun that corrupts protected data 425. Accordingly, when thread 410 reads other vulnerable data from function 422, it will read a corrupt value, and may be directed to an undesirable portion of memory.

To help prevent this unknown buffer overrun from happening, computing system 400 further includes a memory location 450, which may be any volatile or non-volatile memory, which is separate from the stack 420 and that may be used to store copied portions of stack 420. By copying at least the cookies and any protected data located on stack 420 to memory location 450, the cookies can be verified as valid without the risk of a buffer overrun clobbering the protected data 425 while the cookie(s) 430 are authenticated. More specifically, upon determining that the cookie 430 needs to be checked before executing protected data 425, a copy of the cookie value 425 and the protected data 425 is made just before the authentication process. Thereafter, if the cookie 430 is deemed valid using a similar process as previously described (e.g., using comparison module 480 to compare cookie 430 with global cookie 460), the protected data 425 is ensured to be valid. In other words, because the protected data 425 no longer resides on the stack 420, it will not be affected by thread 419 during the authentication process.

In fact, any data after the cookie 430 that is copied can be ensured to also be uncorrupted. Accordingly, note that rather than copying just the cookie value 430 and the protected data 425 when validating a cookie, a larger portion of the stack 420, up to the entire contents thereof, may be copied to memory location 450. Further, the greater the amount of data that is copied to a different memory location, the higher the probability that those portions will not be corrupted or clobbered by a race condition between thread 410 and thread 419. More specifically, to be fully safe, the entire contents should be transferred to a new memory location and once the cookie is authenticated, only the copied contents should be used for subsequent operations (e.g., calling and executing a return address). Nevertheless, embodiments can copy any portion of the stack 420 as deemed necessary and there are many different ways to copy information from stack 420 that are considered within the scope of the appended claims, such as copying a portion of the stack to one memory location and then subsequently copying the cookie and protected data to a different memory location.

Figure 5:
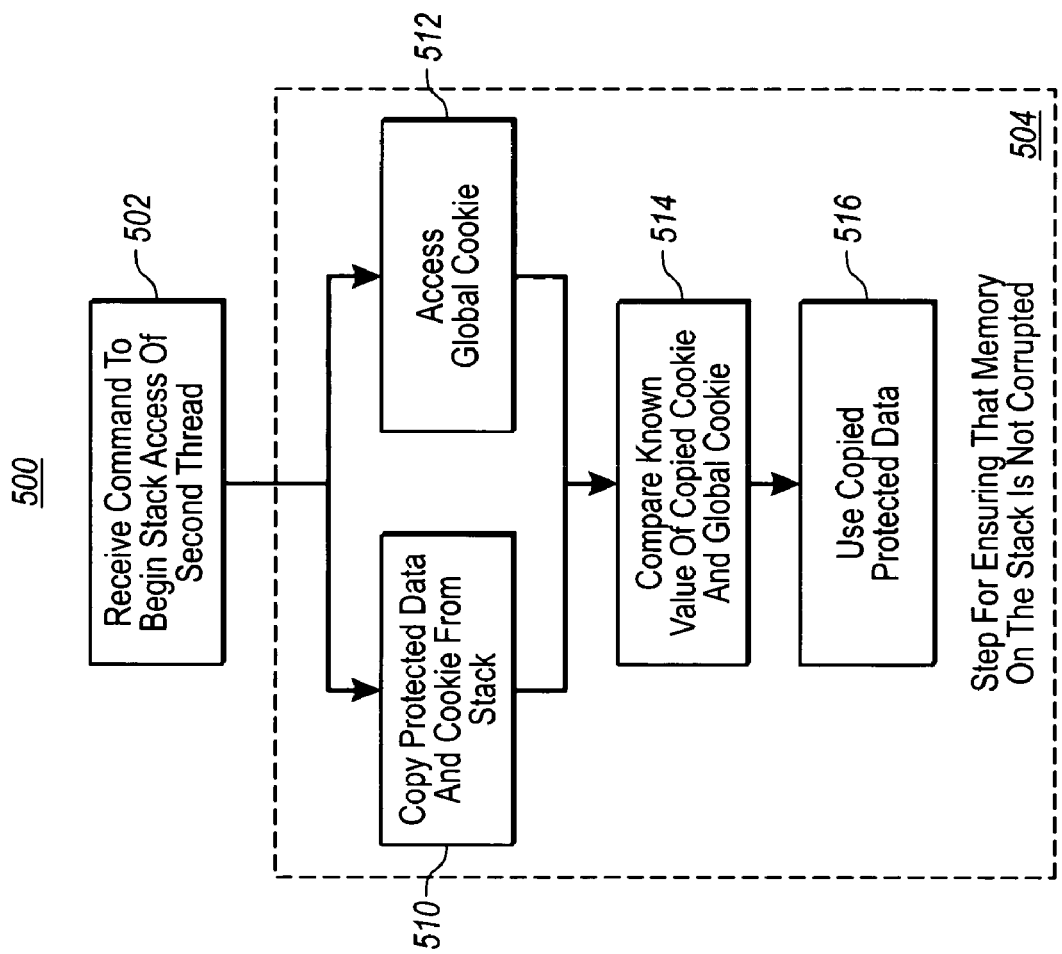
FIG. 5 illustrates a flowchart of a method for ensuring that memory on a stack is not corrupted by a second thread while being accessed from a first thread in accordance with example embodiments.
Figure 6:
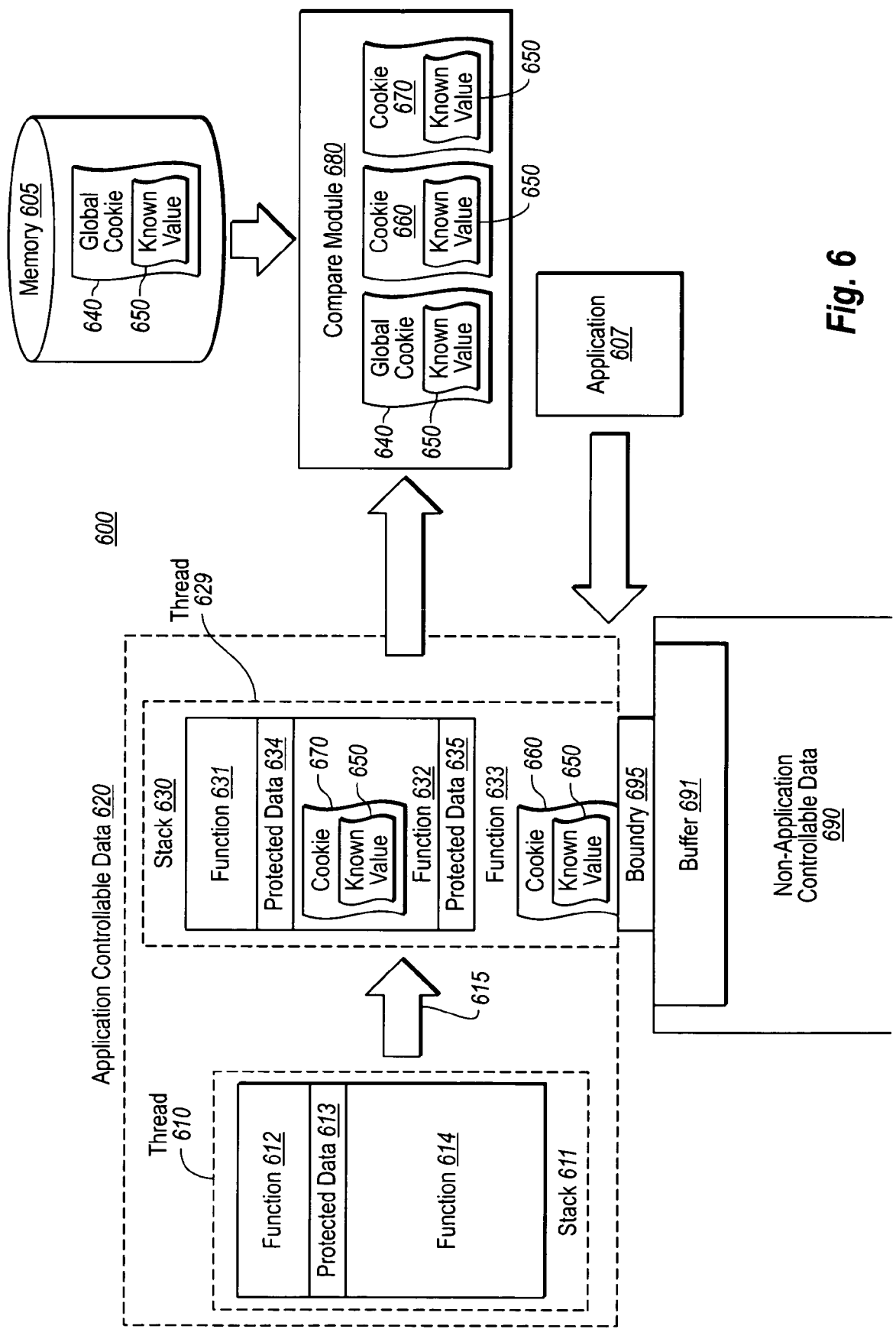
FIG. 6 schematically illustrates a computing system for reducing the likelihood that memory on a stack is corrupted by a second thread while being accessed from a first thread in accordance with example embodiments.

Turning now to FIG. 5, a flowchart of a method 500 for ensuring that memory on a stack is not corrupted by the thread owning the stack is illustrated. Method 500 will be described with frequent reference to the computing system 400 discussed in relation to FIG. 4. However, it should be noted that the computing system 400 is only one of numerous computing systems that can be configured to perform method 500 and should not be used to limit the scope of the appended claims.

FIG. 5 shows that method 500 that includes an act of receiving 502 a command by a first thread to begin a stack access of the stack of a second thread. For example, a command may be received by thread 410 to begin doing a garbage collection operation on stack 420 of thread 419.

In any event, method 500 also includes a step for ensuring 504 that memory on the stack is not corrupted. Although step 504 can comprise any number or order of corresponding acts for accomplishing the desired result, based on the receipt of the command in act 520, step 504 includes an act of coping 510 from the stack to a separate memory location a cookie and protected data. For example, cookie 430 and protected data 425 may be copied to memory location 450. In some embodiments, the entire contents of stack 420 are copied to memory location 450 along with cookie 430 and protected data 425. In another embodiment, only a sub-portion of the stack 420 is copied.

In any event, the copied cookie in the example includes a known value 440 used in determining that a portion of the stack 420 is uncorrupted after the location of the cookie 420, and the protected data is used in calling function(s) on the stack. Accordingly, step 504 further includes an act of accessing 512 a global cookie that includes the known value. Further, step for 504 includes an act of comparing 514 a known value of copied cookie and global cookie. For example, to determine that the copied portions of the stack have not been corrupted after the location of the copied cookie, compare module may 480 compare copied cookie 430 with global cookie 460, wherein this embodiment the cookie value is uncorrupted and thus it is determined that the copied portions of the stack have not been corrupted after the location of the copied cookie 430. Note that as is indicated in FIG. 5, the order that acts 510 and 512 occur are unimportant as the acts may occur simultaneously or one act may occur prior to the other act.

Based on the determination that the stack has not been corrupted pasted the location of the copied cookie, step 504 also includes an act of using 516 the copied protected data to call return function(s). For example, upon determination that function 422 and thereby stack 420 has not been corrupted after the location of copied cookie 430, function of stack 420 can execute copied protected data 425. Advantageously, this process ensures that any simultaneous thread operating on stack 420 does not cause a buffer overrun that overwrites cookie 430 and protected data 425 during the comparison of cookie 430 and global cookie 460.

In another embodiment, the likelihood of a race condition can be reduced by rapidly and frequently checking various cookies on the stack. An example of this embodiment will now be described with regards to FIG. 6. As illustrated, a computing system 600 is provided for reducing the likelihood that memory on a stack is corrupted by a thread owning the stack. As in the previous examples, computing system 600 depicts various modules and components that can be used when implementing the embodiment of the present invention. Computing system 600 is illustrated by way of example only and should not be used to limit the scope of the appended claims. It will be obvious after having read this description that there are numerous other computing systems that may be used to implement embodiments herein.

Computing system 600 includes an application 607 that can utilize stacks 611 and 630 in a manner similar to those previously described in relation to FIGS. 2 and 4 by pushing functions and protected data onto stacks 611 and 630. Stack 630, which belongs to thread 629, includes a function 631 that may call a function 632, which may in turn call a function 633. Function 632 includes protected data 634 and function 633 includes a protected data 635. Both protected data 634 and 635 may allow their respective functions to return control to the respective calling functions as previously discussed. Further, function 632 includes cookie 670, which may include known value 650 if uncorrupted. In addition, function 633 includes a cookie 660, which also includes known value 650 again if uncorrupted (as is assumed in most examples herein described). Note that cookie 660 is placed at a boundary 695 that will further be described below in advantageously helping to reduce the likelihood that stack 630 has been corrupted.

In addition, Stack 611, which belongs to thread 610, includes a function 612 that may call a function 614. Function 614 includes protected data 613 which may allow function 614 to return control to function 614.

Computing system 600 further includes memory 605 which stores a global cookie 640, which includes the known value 650 that is also included in cookies 660 and 670. The known value 650 for both the global cookie 650 and cookies 660 and 670 may be randomly generated at the start of application 607 runtime. As previously discussed, the known value 650 of the global cookie 640 may be compared using compare module 680 with the known values 650 of cookies 660, 670 and any other cookie on stack 630 to determine if stack memory corruption has occurred. As before, compare module 680 can be any comparator capable of comparing two or more values. It may be implemented in software, computer hardware, or any combination of the two.

Computing system 600, as mentioned, also includes a thread 610, which can access stack 630 belonging to thread 629 as illustrated by arrow 615. Thread 610 might be required to inspect the stack 630 belonging to thread 629, for example, for the purpose of garbage collection. As above, because the threads 611 and 629 can simultaneously operate, on the stack 630, there is a risk that during the authentication of cookie values, the protected data may be overwritten by thread 629 in a race condition.

In this embodiment it is noted that computing system 600 includes application controllable data 620 and non-application controllable data 690, which meet at boundary 695. Application controllable data 620 includes those portions threads 611 and 612 that may be controlled by application 607 executing in the runtime environment and may also be referred to managed code. Non-application controllable data 690, on the other hand, includes all portions of computing system 600 that are not controllable by application 607 and may also be referred to as unmanaged code. Non-application controllable operations can be requested by thread 629 from function 633 and so will utilize stack 630.

Non-application controllable data 690 may include a buffer 691, which may be susceptible to a buffer overrun as previously described with relation to FIG. 2. In addition, in some instances a buffer 691 overrun may cross boundary 695 and begin to corrupt portions of stack 630. Since the buffer 691 is located in non-application controllable data 690, there may be little that application 607 can do to prevent such a buffer overrun. As will be described in greater detail below, the general embodiments of this particular embodiment may extend to other types of buffer overruns, and not just those caused by the non-application controllable data 690.

In any event, by placing cookie 660 at boundary 695, application 607 can reduce the likelihood that memory stack 630 is corrupted by race condition caused by buffer 691. For example, thread 610 might want to do a stack-walk of the stack 630 for the purpose of garbage collection. In this example, we will assume that the protected data 634 is to be checked to ensure that it has not been corrupted. Accordingly, in this embodiment, the cookie 660 at the boundary 695 will first be compared with the global cookie value for authentication using a similar process as previously described above. If the cookie 660 at the boundary is not valid, the process is halted, or some other appropriate action may be needed since such indication signals a buffer overrun. If, on the other hand the cookie 660 is valid, the cookie closest to the function of interest is then immediately checked.

For instance, in this example, cookie 670 is checked in accordance with similar processes as previously described. If the cookie 670 is valid, there is a high probability or likelihood that the protected data 634 is also valid, even though thread 629 is operating on the stack 630 at the same time the cookie 670 is being authenticated by thread 610. This is because embodiments herein take advantage of the fact that the overflow must occur first at the boundary, before it reaches the protected data 634. In other words, the authentication of the cookie 670 is a relatively quick process in comparison to writing data onto the stack 630. Accordingly, there is significantly reduced likelihood that the other thread operating on the stack 630 is capable to write data between the boundary 695 up to and beyond the cookie 670 while it is being authenticated.

Note that in this embodiment, that any cookie in the stack may be the first one checked and any one above the first one in the stack may be the second one checked. In other words, the cookie at the boundary does not necessarily have to be checked in order to take advantage of this embodiment. It should be sufficient that a cookie somewhere below the one susceptible to the race condition is checked. Of course, the further the two cookies are apart, the greater the likelihood that thread 629 will be able to fill the memory data in-between the two cookies before the second cookie is checked by thread 611 (provided of course that the first cookie is authenticated). Accordingly, the use of the boundary 695 cookie 660 is used herein for illustrative purposes only and is not meant to limit or otherwise narrow embodiments herein.

Also note that other embodiments do not need to check the second cookie. For example, it may be assumed that since the cookie 670 at the boundary 695 is valid, that all data above the boundary 695 is valid. Of course, that assumes that other functions on the stack do not include allocated buffer space that can also overflow. Accordingly, typically at least two cookies will be checked. Further note, however, that more than just two cookies may also be checked, again to increase the likelihood that a race condition has not occurred. Of course, this may be more processing and memory intensive, and thus some balance of how many and which cookies on the stack to check may be desired.

Figure 7:
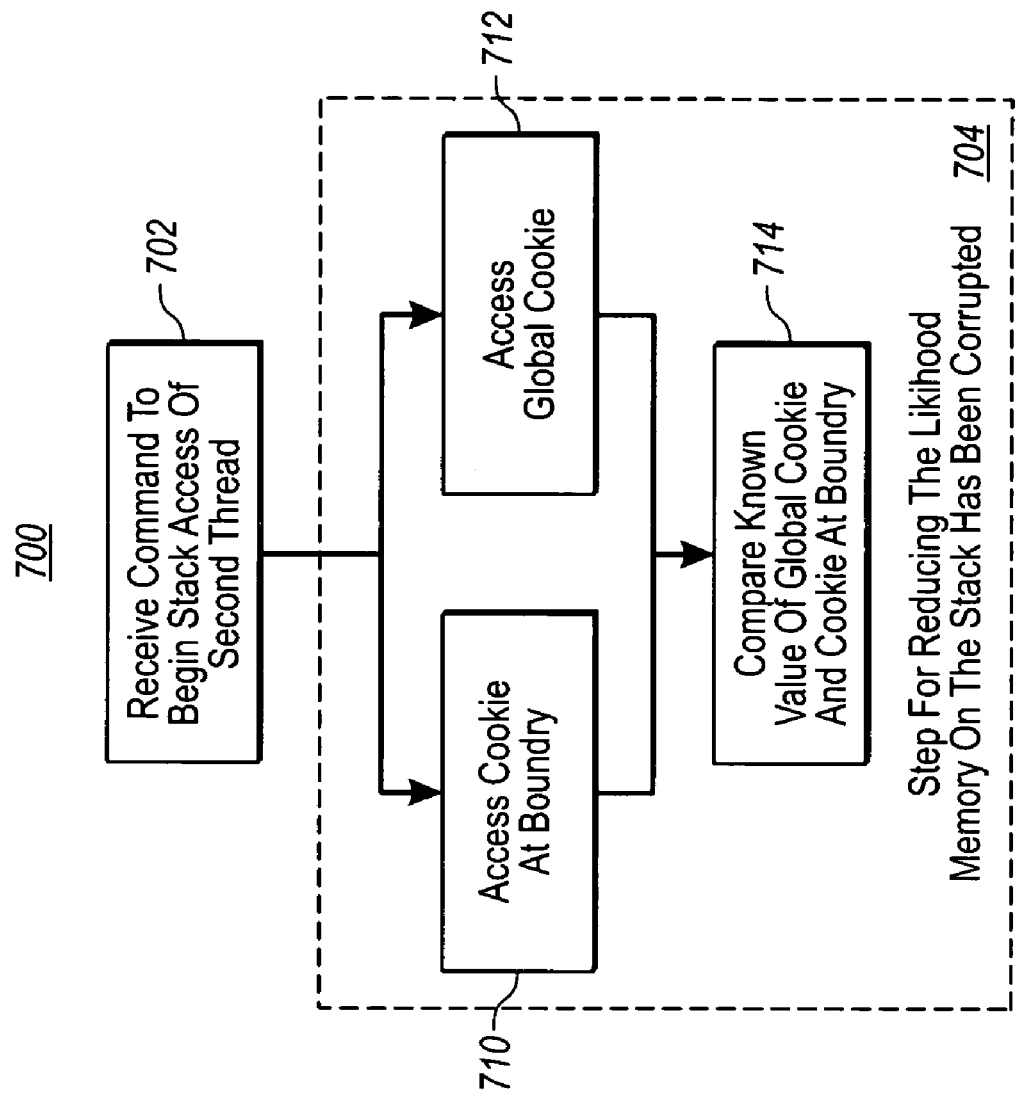
FIG. 7 illustrates a flowchart of a method for reducing the likelihood that memory on a stack is corrupted by a second thread while being accessed from a first thread in accordance with example embodiments.

Turning now to FIG. 7, a flowchart of a method 700 for reducing the likelihood that memory on a stack is corrupted by a second thread owning the stack while a first thread is accessing the stack is illustrated. As with the other flow diagrams, method 700 will be described with frequent reference to the computing system discussed in relation to FIG. 6. Nevertheless, note that the computing system 600 is only one of numerous computing systems that can be configured to perform method 700 and should not be used to limit the scope of the appended claims.

FIG. 7 shows that method 700 includes an act of receiving 702 a command by a first thread to begin a stack access of a stack of a second thread. For example, a command may be received by thread 610 to begin doing a garbage collection operation on stack 630 of thread 629. Of course, this embodiment does not necessarily apply to just stack-walk operations.

Method 700 also includes a step for reducing 704 the likelihood that memory on the stack has been corrupted. Although step 704 can comprise any number or order of corresponding acts for accomplishing the desired result, based on receipt of the command in act 702 step 704 comprises an act of accessing 712 a global cookie and an act of accessing 710 a cookie at a boundary. For example, the global cookie 640 that includes a known value 650 can be accessed along with the known value 650 of the cookie 660 at the boundary between data that is controllable by an application executing the thread for the stack and data that is not controllable by the application executing the thread. As is indicated in FIG. 7, the order that acts 710 and 712 occur are unimportant as the acts may occur simultaneously or one act may occur prior to the other act.

Step 704 further includes an act of comparing 714 the known values of the global cookie and a cookie at the boundary for reducing the likelihood that the stack has been corrupted at the location of the cookie at the boundary. For example, compare module 680 compares cookie at the boundary 660 with global cookie 640. As mentioned, global cookie 640 may include an uncorrupted known value 650. Compare module 680 compares the global cookie known value 650 with known value 650 contained in cookie 660. If cookie 660 has a valid known value 650 (as in this example), then it is likely that stack 630 has not been corrupted by a buffer 691 overrun. If, on the other hand, cookie 660 does not have a valid known value 650, then it is likely that stack 630 has been corrupted by a buffer 691 overrun. Advantageously, this process reduces the likelihood that any thread operating on stack 630 will execute corrupted protected data.

Although the subject matter has been described in language specific to the structural features and/or methodological acts, it is to be understood that the subject matter defined in the appended claims is not necessarily limited to the specific features and acts described above. Rather, the specific features and acts described above are disclosed as example forms of implementing the claims.

We claim:

1. In a computing system having a processor and memory which stores a stack that includes a data area for storing requests, functions, intermediate results, or other data awaiting processing, a method performed by the processor for effectively executing a stack-walk operation by dynamically accessing information about an expected location of a cookie placed on the stack by another operation and used in determining if a portion of the stack has been corrupted, the method comprising:

calling a first function that executes a stack-walk operation for identifying protected data on a stack, the stack being stored in the memory of the computing system;

while performing the stack-walk operation, accessing cookie location information stored in the memory for determining where a second function different from the first function placed a cookie on the stack, wherein if uncorrupted the cookie includes a known value used in determining that a portion of the stack is uncorrupted after the determined location of the cookie;

based on the cookie location information, accessing corrupt data on the stack representative of the cookie;

accessing a global cookie from a secure location separate from the stack for determining the known value;

comparing the corrupt data with the known value for determining that memory corruption has occurred on the stack at least up to the corrupt data representative of the cookie; and upon determining that memory corruption has occurred, throwing an exception that terminates the stack-walk or terminating the process to avoid a security exploit because of the corruption.

2. A method in accordance with claim 1, wherein the cookie location information is dynamically maintained as a list of cookie locations.

3. A method in accordance with claim 1, wherein the cookie location information is maintained within a list of one or more cookies on the stack, with the location of at least one cookie in the list stored in memory separate from the stack.

4. A method in accordance with claim 1, wherein the cookie location information is accessed based upon identifying protected data of functions which placed the cookies on the stack.

5. A method in accordance with claim 1, wherein the first function is a garbage collection operation.

6. A method in accordance with claim 1, wherein the first function is an exception handling operation.

7. A method in accordance with claim 1, wherein the first function asks for a list of all functions on the stack.

8. One or more computer storage media having stored thereon computer-executable instructions that, when executed by one or more processors of a computing system, cause the computing system to perform a method comprising:

calling a first function that executes a stack-walk operation for identifying protected data on a stack, the stack being stored in memory of the computing system;

while performing the stack-walk operation, accessing cookie location information stored in the memory for determining where a second function different from the first function placed a cookie on the stack, wherein if uncorrupted the cookie includes a known value used in determining that a portion of the stack is uncorrupted after the determined location of the cookie;

based on the cookie location information, accessing corrupt data on the stack representative of the cookie;

accessing a global cookie from a secure location separate from the stack for determining the known value;

comparing the corrupt data with the known value for determining that memory corruption has occurred on the stack at least up to the corrupt data representative of the cookie; and upon determining that memory corruption has occurred, throwing an exception that terminates the stack-walk or terminating the process to avoid a security exploit because of the corruption.

9. The one or more computer storage media in accordance with claim 8, wherein the cookie location information is dynamically maintained as a list of cookie locations.

10. The one or more computer storage media in accordance with claim 8, wherein the cookie location information is maintained within a list of one or more cookies on the stack, with the location of at least one cookie in the list stored in memory separate from the stack.

11. The one or more computer storage media in accordance with claim 8, wherein the cookie location information is accessed based upon identifying protected data of functions which placed the cookies on the stack.

12. The one or more computer storage media in accordance with claim 8, wherein the first function is a garbage collection operation.

13. The one or more computer storage media in accordance with claim 8, wherein the first function is an exception handling operation.

14. The one or more computer storage media in accordance with claim 8, wherein the first function asks for a list of all functions on the stack.

* * * * *

UNITED STATES PATENT AND TRADEMARK OFFICE
CERTIFICATE OF CORRECTION

| | | |
|---|---|---|
| PATENT NO. | : 7,631,249 B2 | Page 1 of 1 |
| APPLICATION NO. | : 11/250347 | |
| DATED | : December 8, 2009 | |
| INVENTOR(S) | : Shrikrishna V. Borde et al. | |

It is certified that error appears in the above-identified patent and that said Letters Patent is hereby corrected as shown below:

In column 2, line 30, after "of the" insert -- memory management routine and/or security functions cause the scan of the stack --.

Signed and Sealed this
Tenth Day of May, 2011

David J. Kappos
*Director of the United States Patent and Trademark Office*